Feb. 15, 1938.   E. R. SUTCLIFFE   2,108,730
ADSORPTION APPARATUS
Filed July 14, 1936
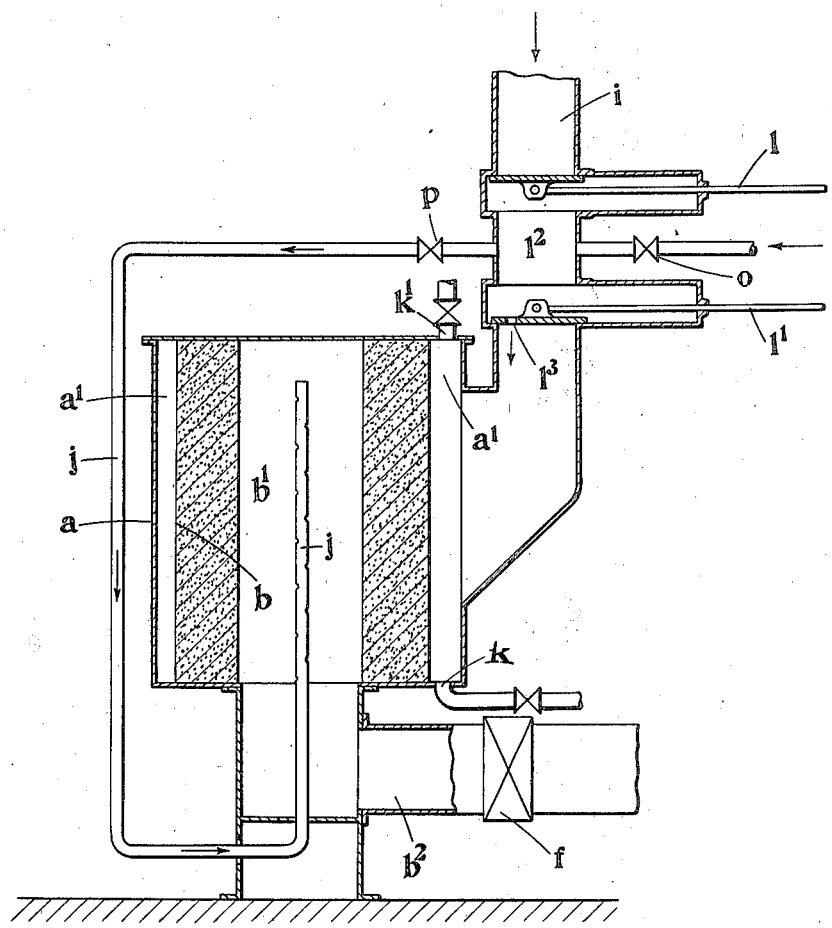
Inventor
E. R. Sutcliffe:
by
W. E. Evans
Attorney.

Patented Feb. 15, 1938

UNITED STATES PATENT OFFICE 2,108,730

ADSORPTION APPARATUS

Edgar Rouse Sutcliffe, Lowton, Newton-le-Willows, England

Application July 14, 1936, Serial No. 90,616
In Great Britain September 29, 1934

4 Claims. (Cl. 183—4)

The invention relates to apparatus for the recovery by adsorption of vapours by the use of sorptive filtering media such as active carbon, and to the recovery of solvents from vapour laden air by the use of such media.

The invention has among its objects to avoid the liability of combustion or explosion within the adsorption apparatus when recovering solvents such as carbon bisulphide that in admixture with air will burn.

It has been found in practice that when flushing off solvents adsorbed by the filtration of vapour laden air through a sorptive filtering medium there is liability due for example to leaky valves that the solvent may pass out through the valve on the inlet conduit for solvent laden air that is ineffectively closed and is thus liable to leak in the flushing operation, and that the solvent may condense in the conduit or cooler parts of the apparatus where the heat of the steam may be sufficient for the combustion of the mixture formed by the vapour and the air present. Furthermore in adsorption plants for the recovery of vapour from solvent laden air there is liability of air being left in the outer annular space surrounding the container of the sorptive medium where the flushing with steam commences from the central space in the container and thus there is a risk of an explosive mixture being formed on the solvent vapour from the sorptive material being driven into the outer annular space. The invention has among its objects to avoid these effects.

According to the invention in an adsorption filter equipped for charging the sorptive filtering medium in periods alternating with periods in which the sorptive filtering medium is flushed with steam or other inert gas means are provided in addition for the supply during the flushing operation of steam or other inert gas to the conduit or the lower part of the conduit adjacent the filter, which in the charging periods serves for admission to the filter of the solvent or vapour laden air to be filtered, whereby the formation in the flushing operation of an explosive mixture may be avoided in the said conduit and in that part of the filter communicating with it. The steam supply for the purpose is advantageously small in quantity. According to the invention moreover the conduit for the admission of the solvent or vapour laden air is provided with two valves open in the charging operation and spaced apart to form between them on their closure a chamber from which during the flushing operation steam or inert gas may be derived for admission into that part of the conduit communicating with the filter.

The invention comprises the features of the construction which are hereinafter described.

The invention is illustrated diagrammatically in the accompanying drawing which shows an adsorption apparatus for solvent recovery of a type described in the prior specification of the United Kingdom No. 397,128.

In carrying the invention into effect as illustrated in the accompanying diagrammatic drawing in its application to an adsorption apparatus for solvent recovery of the type of the prior patent of the United Kingdom No. 397,128, a cylindrical filter casing $a$ is provided with an inner annular casing or container $b$ within which a central casing $b^1$ is formed, the annular casing $b$ being charged with a sorptive filtering medium such as active charcoal in a granular condition. The solvent or vapour laden air passes through the inlet conduit $i$ into the annular space $a^1$ between the outer casing $a$ and the inner annular casing $b$, the solvent or vapour laden air being stripped of its content of the solvent or other vapour in its passage through the filtering medium and the air stripped of the vapour passes into the central cylindrical space $b^1$ and thence downwardly and outwardly through the outlet pipe $b^2$ under suction of a fan. When the sorptive medium within the annular casing $b$ is charged or nearly charged to its capacity for adsorption with the solvent or vapour, the inlet valve usually provided on the conduit $i$ is closed, and the valve such as $f$ usually provided on the outlet pipe $b^2$ for the stripped air is also closed; thereupon steam or inert gas is passed through the sorptive medium within the annular casing $b$ usually in a direction opposite to that of the stream of solvent or vapour laden air, and the steam with the vapour passes out of the casing under suction through an outlet $k$ in the lower part of the casing $a$ or $k^1$ at the upper part of the casing or elsewhere on its way to the condenser.

According to the present invention the steam used in flushing the filter and removing the adsorbed vapour is passed into the inlet pipe or conduit $i$ for vapour laden air above the valve $l^1$ and in position between two valves $l$, $l^1$, by which in the closed position of the valves $l$, $l^1$ a chamber $l^2$ is formed in the inlet pipe $i$ from which the steam used in the flushing operation of the filter may pass through the pipe $j$ into the central space $b^1$ within the filter casing, the steam thence passing through the charge in the annular casing $b$, whereby the steam and vapour discharge into the annular space $a^1$ and thence pass outward through an outlet such as $k$ or $k^1$. The valves $l$, $l^1$ are in the drawing indicated as sliding disc valves that are operated by valve rods, but any other construction of valve may be provided by which on the closure of the valves a chamber or space such as $l^2$ may be closed to serve for example as a steam chamber into which on opening the steam valve $o$ steam may pass into the chamber between the valves $l$, $l^1$ and on opening the valve $p$ may pass into the steam pipe $j$, on the valves controlling the outlets such as $k$ or $k^1$ being opened. Thus possible leakage from the filter through the valves, in the flushing operation due for example to faulty seating of the valves, is prevented by the incoming steam which passes under pressure from the chamber or space $l^2$ into the filter, thus preventing the outward escape of solvent vapour through the valves.

The lower valve $l^1$ may according to the invention be provided with a small hole or a number of small holes $l^3$ through which steam may pass direct into the filter at the opposite side to which the main part of the steam is passed in flushing. By such means the possibility of the formation of an explosive mixture in the annular space $a^1$ or in the lower part of the pipe or conduit $i$ is avoided.

It will be understood that the invention is not limited in its application to plants for solvent recovery nor to adsorption apparatus of the type hereinbefore described. It may be applied to adsorption apparatus of other types such as that of the patent of the United Kingdom No. 415,801, in which steam may be admitted to the conduit $i$ at a position between two valves $l$, $l^1$ and below the valve $l^1$ in the flushing operation as hereinbefore described.

Instead of steam being employed for the purpose of the invention any gas inert under the conditions of charging or flushing the filter may be employed.

I claim:

1. In an adsorption filter for the adsorption of vapour from vapour laden air, in combination a filter casing, a container for the sorptive medium within the filter casing, an inlet conduit into the filter casing for the air to be filtered in the charging phase and an outlet conduit from the filter casing for the filtered air, two valves in series in said inlet conduit both adapted to be opened in the charging phase, to permit the air to flow through them in series, and closed in the flushing phase, said valves on their closure being spaced apart in the said inlet conduit to form between them a chamber for the reception of inert gas, a valve-controlled inlet conduit into the said chamber for the inert gas and a valve controlled outlet conduit from said chamber into the filter casing in position to cause the inert gas from said chamber to flow through the container, sorptive medium and casing in direction opposite to that in which the air to be filtered passes through the filter casing in the charging phase.

2. In an adsorption filter for the adsorption of vapour from vapour laden air, in combination a filter casing, a container for the sorptive medium within the filter casing, an inlet conduit into the filter casing for the air to be filtered in the charging phase and an outlet conduit from the filter casing for the filtered air, two valves in series in said inlet conduit both adapted to be opened in the charging phase and closed in the flushing phase, said valves on their closure being spaced apart in the said inlet conduit to form between them a chamber for the reception of inert gas, a valve-controlled inlet conduit into the said chamber for the inert gas and a valve-controlled outlet conduit from said chamber into the filter casing in position to cause the inert gas from said chamber to flow through the container, sorptive medium and casing in direction opposite to that in which the air to be filtered passes through the filter casing in the charging phase and a supplementary inlet for admitting inert gas in the flushing phase into the inlet conduit for the air to be filtered at a position between said chamber and the filter casing.

3. In an adsorption filter for the adsorption of vapour from vapour laden air, in combination a filter casing, a container for the sorptive medium within the filter casing, an inlet conduit into the filter casing for the air to be filtered in the charging phase and an outlet conduit from the filter casing for the filtered air, two valves in series in said inlet conduit both adapted to be opened in the charging phase and closed in the flushing phase, said valves on their closure being spaced apart in the said inlet conduit to form between them a chamber for the reception of inert gas, a valve-controlled inlet conduit into the said chamber for the inert gas and a valve-controlled outlet conduit from said chamber into the casing in position to cause the inert gas from said chamber to flow through the container, sorptive medium and casing in direction opposite to that in which the air to be filtered passes through the filter casing in the charging phase, one of said valves forming the chamber having an opening for the admission of inert gas to the casing during the flushing phase.

4. In an adsorption filter for the adsorption of vapour from vapour laden air, a filter casing having an inlet for the admission of the air to be filtered and an outlet for the filtered air, a sorptive medium within the casing interposed between said inlet and outlet so that the air flowing to the outlet must pass through said medium, valves for closing said inlet and outlet to prevent the flow of vapour laden air into the filter casing and the outflow of filtered air therefrom, means for admitting a main supply of inert gas into said casing between the sorptive medium and the outlet valve, when said inlet and outlet valves are closed, to cause the gas to flow through the sorptive medium in a reverse direction to that in which the filtered air flows when said inlet and outlet valves are open, means for admitting a supplementary supply of inert gas into said casing in the space between the inlet valve and the sorptive medium while the main supply of inert gas is flowing through the sorptive medium, and a valve-controlled outlet in the casing for permitting the escape of inert gas and other products from the latter space.

EDGAR ROUSE SUTCLIFFE.